(12) United States Patent
Chung et al.

(10) Patent No.: US 6,885,647 B1
(45) Date of Patent: Apr. 26, 2005

(54) BASE STATION FOR COMPENSATING ROUTE DELAY BETWEEN BASES STATION AND MOBILE STATION OF CDMA MOBILE COMMUNICATION SYSTEM AND OPERATION METHOD THEREOF

(75) Inventors: Chae-Hun Chung, Ichon-shi (KR); Yang-Soo Shin, Ichon-shi (KR)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/470,852

(22) Filed: Dec. 23, 1999

(30) Foreign Application Priority Data

Dec. 30, 1998 (KR) ............................................ 98-61768

(51) Int. Cl.[7] ................................................ H04J 13/00
(52) U.S. Cl. ........................ 370/335; 370/350; 370/519
(58) Field of Search ................................. 370/335, 342, 370/350, 503, 519, 508, 320, 324, 441, 479, 517; 375/140; 455/13.2, 18, 24

(56) References Cited

U.S. PATENT DOCUMENTS

| | | | | |
|---|---|---|---|---|
| 5,781,541 A | * | 7/1998 | Schneider | 370/335 |
| 5,875,402 A | * | 2/1999 | Yamawaki | 455/502 |
| 6,477,183 B1 | * | 11/2002 | Yamamoto | 370/508 |
| 6,480,483 B1 | * | 11/2002 | Yahata et al. | 370/350 |

FOREIGN PATENT DOCUMENTS

WO    WO 99/16183    4/1999

* cited by examiner

*Primary Examiner*—Chau Nguyen
*Assistant Examiner*—Duc Duong
(74) *Attorney, Agent, or Firm*—McDonnell Boehnen Hulbert & Berghoff LLP

(57) ABSTRACT

A base station for compensating a fixed route delay between a base station and a mobile station of a CDMA mobile communication system and an operation method thereof are disclosed. This base station includes a clock signal generation unit for receiving a 10 MHz, TOD and 1 PPS signal from a GPS receiving unit and generating a 1st even second clock signal in synchronization with the 1 PPS and a 2nd even second clock signal which is obtained by delaying the 1st even second clock signal by a maximum bidirectional propagation delay time between a base station and a relay unit, a first signal processing unit for receiving the 1st even second clock signal from the clock signal generation unit and modulating a forward link channel from the base station to a mobile station in synchronization with the 1st even second clock signal, and a second signal processing unit for receiving the 2nd even second clock signal from the clock signal generation unit and demodulating a backward link channel from the mobile station to the base station in synchronization with the 2nd even second clock signal, for thereby compensating a decrease of a cell communication radius due to a fixed route delay factor on a communication route between a base station and a mobile station.

20 Claims, 13 Drawing Sheets

BASE STATION FOR COMPENSATING ROUTE DELAY BETWEEN BASES STATION AND MOBILE STATION OF CDMA MOBILE COMMUNICATION SYSTEM AND OPERATION METHOD THEREOF

BACKGROUND OF THE INVENTION

1. Field of the Invention

The present invention relates to a base station of a CDMA mobile communication system and an operation method thereof, and in particular to a base station for compensating a route delay fixed between a base station and a mobile station of a CDMA mobile communication system and an operation method thereof which are capable of effectively compensating a route delay in a relay unit or satellite on a communication route between a base station and a mobile station due to a hardware-based delay of a modem ASIC of a channel card of a CDMA base station.

2. Description of the Background Art

In a conventional CDMA mobile communication system, all mobile stations and base stations operate based on a time synchronization to a reference clock signal of a CDMA system. In addition, the mobile station is set synchronously with the base station by obtaining a time information based on a message transmitted from the base station and setting a reference time. At this time, the reference time set by the mobile station is delayed compared to the referee time of the base station due to a delay of a propagation signal from the base station to the mobile station and a signal processing delay by the mobile station.

In addition, the mobile station transmits a signal in synchronization with the reference time. The reverse direction link signal is transmitted based on a synchronization, however, this signal is received with a time delay (hereinafter called bidirectional propagation delay) at a system reference clock.

In addition, at the CDMA system, the maximum limit value of the bidirectional propagation delay is limited based on a hardware construction by a base station modem ASIC (Application Specific IC), and the maximum limit value is about 416 µs. When computing the maximum limit value based on a cell communication radius by an open area, it corresponds to about 62 Km(416 µs*light speed/2).

However, in the conventional CDMA system, the maximum cell communication range is limited based on a timing by the base station modem ASIC. In addition, when using a satellite or a relay unit between the base station and the mobile station, a fixed route delay additionally occurs, so that the cell communication radius is decreased by the above-described additional route delay amount.

As another problem, when the above-described additional route delay exceeds a the maximum bidirectional propagation delay time between the base station and the mobile station, a communication failure occurs.

SUMMARY OF THE INVENTION

Accordingly, it is an object of the present invention to provide a base station for compensating a fixed route delay between a base station and a mobile station of a CDMA mobile communication system and an operation method thereof which are capable of compensating a decrease of a cell communication radius due to a fixed route delay factor on a communication route between a base station and a mobile station.

In order to achieve the above objects, there is provided a base station for compensating a route delay factor fixed between a base station and a mobile station of a CDMA mobile communication system according to a first embodiment of the present invention, which includes a clock signal generation unit for receiving a 10 MHz, TOD and 1 PPS signal from a GPS receiving unit and generating a 1st even second clock signal in synchronization with the 1 PPS and a 2nd even second clock signal which is obtained by delaying the 1st even second clock signal by a maximum bidirectional propagation delay time between a base station and a relay unit, a first signal processing unit for receiving the 1st even second clock signal from the clock signal generation unit and modulating a forward link channel from the base station to a mobile station in synchronization with the 1st even second clock signal, and a second signal processing unit for receiving the 2nd even second clock signal from the clock signal generation unit and demodulating a backward link channel from the mobile station to the base station in synchronization with the 2nd even second clock signal.

In order to achieve the above objects, there is provided a base station operation method for compensating a fixed route delay factor between a base station and a mobile station of a CDMA mobile communication system according to a second embodiment of the present invention, which includes the steps of a first step in which a clock generation unit receives a 10 MHz, TOD, and 1 PPS from a GPS receiving unit and generates a 1st even second clock signal in synchronization with the 1 PPS and a 2nd even second clock signal obtained by delaying the 1st even second clock signal by a maximum bidirectional propagation delay time between the base station and a relay unit, a second step in which first and second signal processing units receive 1st and 2nd even second clock signals and modulate a pilot channel, a synchronous channel and a call channel from the first signal processing unit in synchronization with the 1st even second clock signal, a third step in which when an access channel is transmitted from the mobile station, the second signal processing detects and demodulates the access channel from the mobile station in synchronization with the 2nd even second clock signal, a fourth step in which the first signal processing unit modulates a communication channel in synchronization with the 1st even second clock signal, and a fifth step in which when a communication channel is transmitted from the mobile station, the second signal processing unit detects and demodulates the communication channel from the mobile station in synchronization with the 2nd even second clock signal.

In order to achieve the above objects, there is provided a base station for compensating a route delay factor fixed between a base station and a mobile station of a CDMA mobile communication system according to a third embodiment of the present invention, which includes a clock signal generation unit for receiving a 10 MHz, TOD and 1 PPS signal from a GPS receiving unit and generating a 1st even second clock signal in synchronization with the 1 PPS and a 2nd even second clock signal which is obtained by delaying the 1st even second clock signal by a maximum bidirectional propagation delay time between a base station and a relay unit, a first signal processing unit for receiving the 1st even second clock signal from the clock signal generation unit and modulating a pilot channel, a synchronous channel and a call channel of a forward link from the base station to a mobile station in synchronization with the 1st even second clock signal, and a second signal processing unit for detecting a communication channel from the clock signal generation unit in synchronization with the 2nd even second clock signal and modulating the communication channel of the forward link from the base station to the mobile station by expediting by the maximum bidirectional propagation delay time between the base station and the relay unit.

In order to achieve the above objects, there is provided a base station operation method for compensating a fixed route delay factor between a base station and a mobile station of a CDMA mobile communication system according to a fourth embodiment of the present invention, which includes the steps of a first step in which a clock signal generation unit receives a 10 MHz, TOD and 1PPS signal from a GPS receiving unit and generates a 1st even second clock signal in synchronization with the 1PPS and a 2nd even second clock signal by delaying the 1st even second clock signal by the maximum bidirectional propagation delay time between a base station and a relay unit, a second step in which first and second signal processing unit receive 1st and 2nd even second clock signals and modulate a pilot channel, a synchronous channel and a call channel from the first signal processing unit in synchronization with the 1st even second clock signal, a third step when an access channel is transmitted from the mobile station, the second signal processing unit detects and demodulates an access channel from the mobile station in synchronization with the 2nd even second clock signal, a fourth step in which the second signal processing unit modulates a communication channel of a forward link from a base station to a mobile station by expediting by the maximum bidirectional delay time between a base station and a relay unit, and a fifth step in which when a communication channel is transmitted from the mobile station, the second signal processing unit detects and demodulates a communication channel from the mobile station in synchronization with the 2nd even second clock signal.

In order to achieve the above objects, there is provided a base station for compensating a fixed route delay factor between a base station and a mobile station of a CDMA mobile communication system according to a fifth embodiment of the present invention, which includes a clock signal generating unit for receiving a 10 MHz, TOD and 1 PPS signal from a GPS receiving unit and generating a 1st even second clock signal in synchronization with the 1PPS, a 1"st signal processing unit for receiving the 1st even second clock signal from the clock signal generation unit, modulating a pilot channel, a synchronous channel and a call channel of a forward link from a base station to a mobile station by expediting by the maximum bidirectional propagation delay time and detecting and demodulating an access channel of the backward link from the mobile station to the base station in synchronization with the 1st even second clock signal, and a 2"nd signal processing unit for receiving, the 1st even second clock signal from the clock signal generation unit, modulating a communication channel of a forward link from the base station to the mobile station by expediting by the maximum bidirectional propagation delay time between the base station and the relay unit and detecting and demodulating a communication channel of a backward link from the mobile station to the base station in synchronization with the 1st even second clock signal.

In order to achieve the above objects, there is provided a base station operation method for compensating a fixed route delay factor between a base station and a mobile station of a CDMA mobile communication system according to a sixth embodiment of the present invention, which includes the steps of a 1" st step in which a clock signal generation unit receives a 10 MHz, TOD and 1PPS signal from a GPS receiving unit and generates a 1st even second clock signal in synchronization with the 1PPS, a second step in which said 1" st and 2" nd signal processing units receive a 1st even second clock signal and modulate a pilot channel, a synchronous channel and a call channel by expediting by the maximum bidirectional propagation delay time between a base station to a relay unit, a third step in which when an access channel is transmitted from the mobile station, the 1"st signal processing unit detects and demodulates an access channel from the mobile station in synchronization with the 1st even second clock signal, a fourth step in which the 2"nd signal processing unit modulates a communication channel of a forward link from the base station to the mobile station by expediting by the maximum bidirectional propagation delay time between the base station and the relay unit, and a fifth step in which when a communication channel is transmitted from the mobile station, the 2"nd signal processing unit detects and demodulates the communication channel from the mobile station in synchronization with the 1st even second clock signal.

In order to achieve the above objects, there is provided a base station for compensating a route delay factor fixed between a base station and a mobile station of a CDMA mobile communication system according to a seventh embodiment of the present invention, which includes a clock signal generation unit for receiving a 10 MHz, TOD and 1 PPS signal from a GPS receiving unit and generating a 1st even second clock signal in synchronization with the 1 PPS and a 3rd even second clock signal which is obtained by delaying the 1st even second clock signal by a maximum bidirectional propagation delay time between a base station and a relay unit, a signal processing unit for receiving a 3rd even second clock signal from the clock signal generation unit and modulating and transmitting a forward link channel from a base station to a mobile station in synchronization with the 3rd even second clock signal, and a signal processing unit for receiving the 1st even second clock signal from the clock signal generation unit and detecting and demodulating a backward link channel from the mobile station to the base station in synchronization with the 1st even second clock signal.

In order to achieve the above objects, there is provided a base station for compensating a route delay factor fixed between a base station and a mobile station of a CDMA mobile communication system according to an eighth embodiment of the present invention, which includes a clock signal generation unit for receiving a 10 MHz, TOD and 1 PPS signal from a GPS receiving unit and generating a 1st even second clock signal in synchronization with the 1 PPS and a 3rd even second clock signal which is obtained by delaying the 1st even second clock signal by a maximum bidirectional propagation delay time between a base station and a relay unit, a signal processing unit for receiving the 3rd even second clock signal from the clock signal generation unit and modulating a pilot channel, a synchronous channel and a call channel of a forward link from a base station to a mobile station in synchronization with the 3rd even second clock signal, and a signal processing unit for receiving the 1st even second clock signal from the clock signal generation unit, demodulating a backward link channel from the mobile station to the base station in synchronization with the 1st even second clock signal and modulating a communication channel of a forward link from the base station to the mobile station by expediting by the maximum bidirectional propagation delay time between the base station to the relay unit.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be explained with reference to the accompanying drawings.

Figure 1:
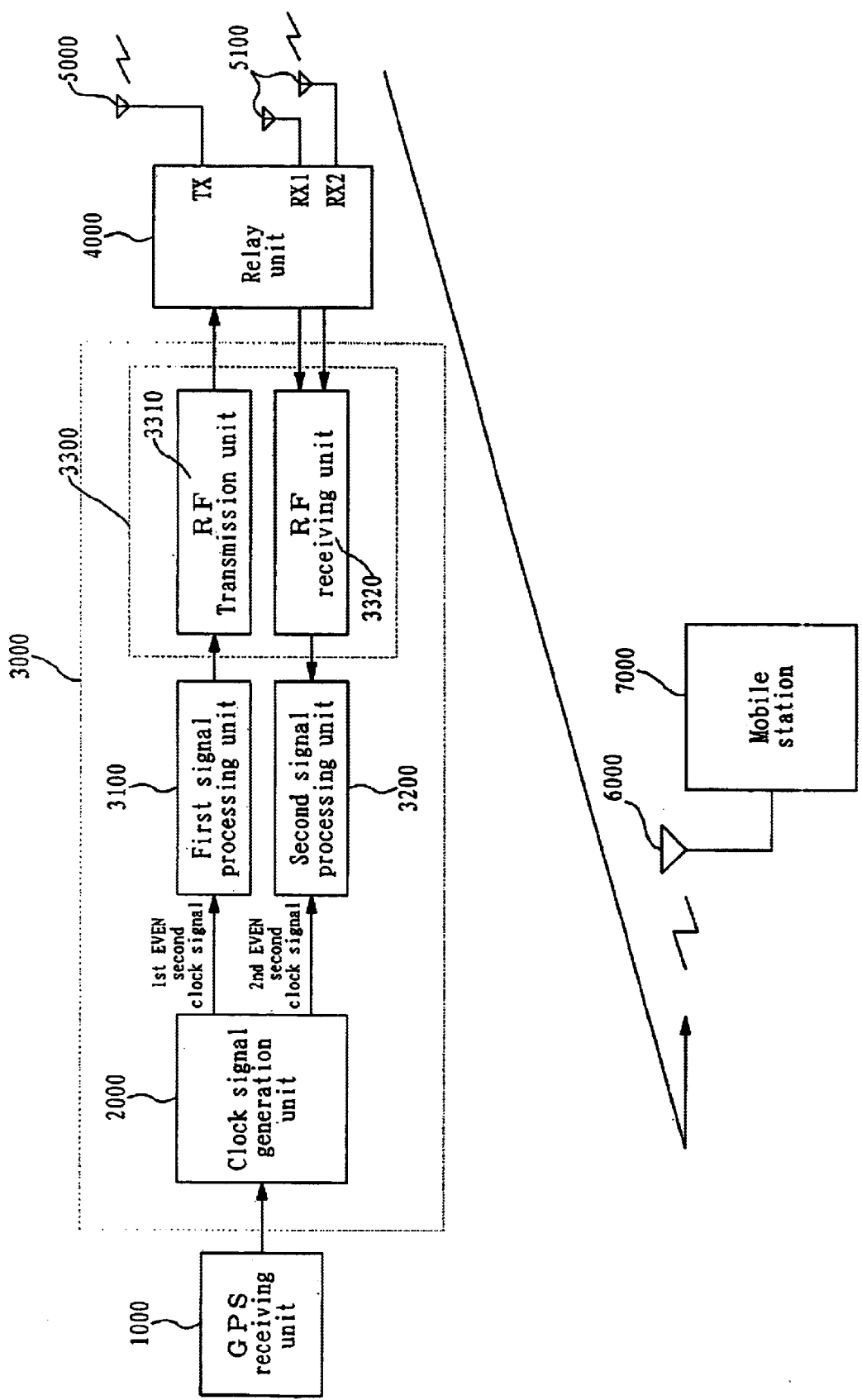
FIG. 1 is a block diagram illustrating a CDMA mobile communication system which adapts a base station for compensating a fixed route delay factor between a base station and a mobile station of a CDMA mobile communication system according to a first embodiment of the present invention.
Figure 2:
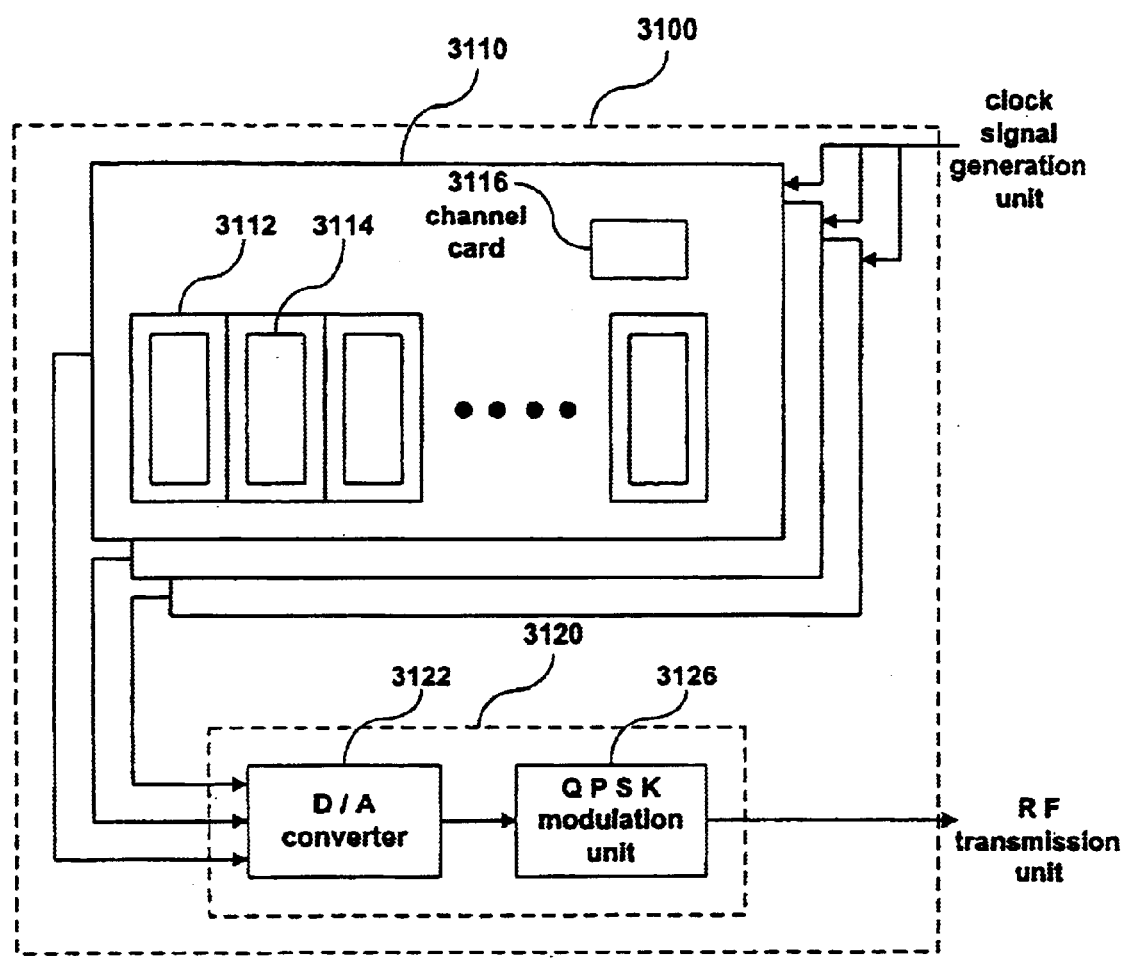
FIG. 2 is a detailed circuit diagram illustrating a first signal delay unit of FIG. 1.
Figure 3:
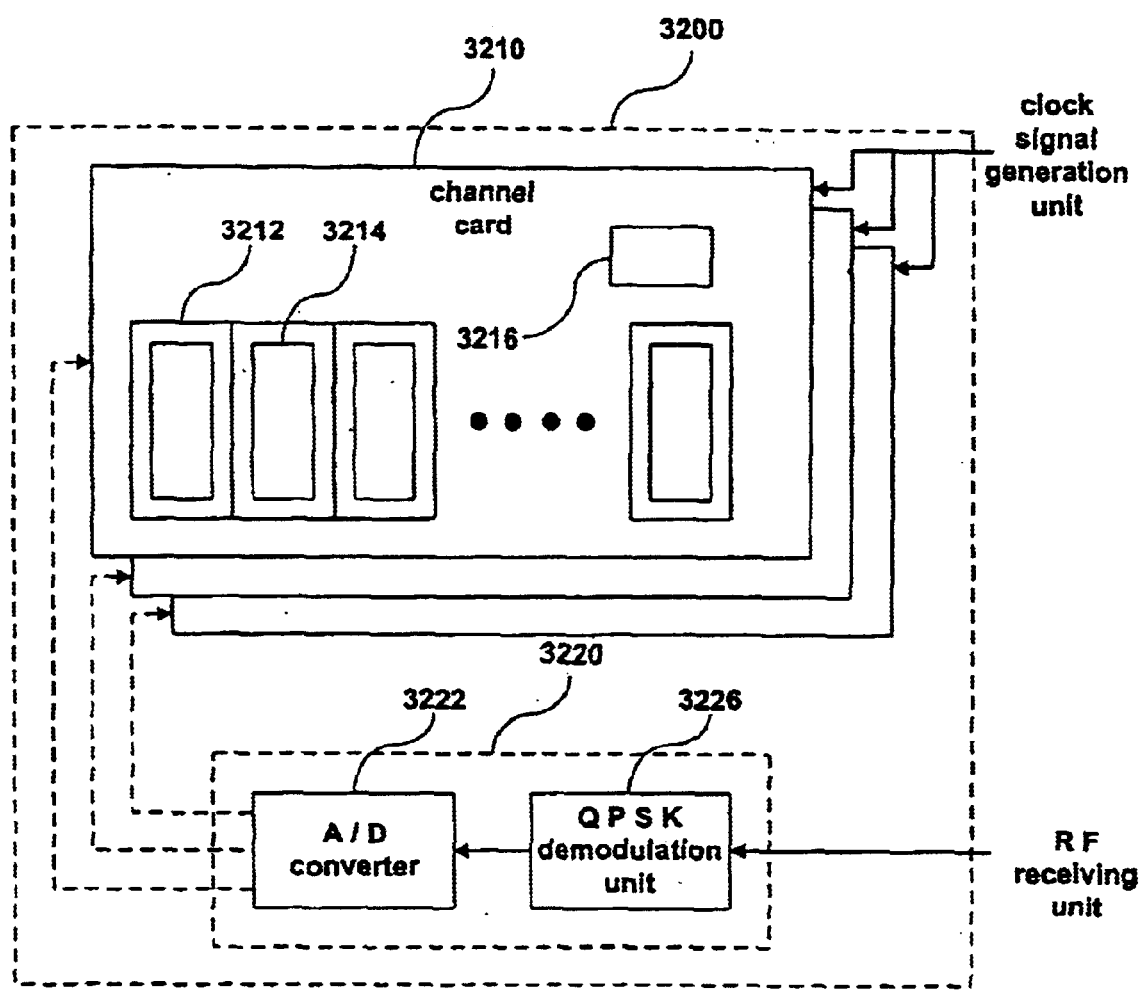
FIG. 3 is a detailed circuit diagram illustrating a second signal delay unit of FIG. 1.

FIG. 1 is a block diagram illustrating a CDMA mobile communication system which adapts a base station for compensating a fixed route delay factor between a base station and a mobile station of a CDMA mobile communication system according to a first embodiment of the present invention, FIG. 2 is a detailed circuit diagram illustrating a first signal delay unit of FIG. 1 and FIG. 3 is a detailed circuit diagram illustrating a second signal delay unit of FIG. 1.

As shown therein, the CDMA mobile communication system which adapts a base station for compensating a fixed route delay factor between a base station and a mobile station of a CDMA mobile communication system according to the first embodiment of the present invention includes a clock signal generation unit 2000, abase station 3000 formed of first and second signal processing units 3100 and 3200 and a RF signal processing unit 3300, a relay unit 4000 for receiving a RF signal of a forward link from the base station 3000 and receiving a reverse direction link RF signal from a mobile station 7000 (which will be explained later) for thereby enabling the base station 3000 and the mobile station 7000 to transmit and receive the signal, and a mobile station 7000 which is a subscriber terminal capable of transmitting and receiving a CDMA channel based on the base station 3000 and the relay unit 4000.

The clock signal generation unit 2000 receives a 10 MHz, TOD(Time Of Day) and a 1PPS(Pulse Per Second) signal from the GPS(Global positioning System) receiver 1000 and generates a 1st even second clock signal and a 2nd even second clock signal which is obtained by delaying the 1st even second clock signal by the maximum bidirectional propagation delay time 30 between the base station 3000 and the relay unit 4000.

In addition, the first signal processing unit 3100 receives the 1st even second clock signal from the clock signal generation unit 2000 and modulates the forward link channel (pilot channel, synchronous channel and communication channel) from the base station 3000 to the mobile station 7000 in synchronization with the 1st even second clock signal and then transmits a resultant signal to the RF signal processing unit 3300.

As shown in FIG. 2, the first signal processing unit 3100 includes more than one channel cards 3110 and an analog modulation unit 3120.

The channel card 3110 includes more than one channel elements 3112 including one set of the base station modem ASIC 3114 for modulating a digital signal, and a channel card processor 3116 for controlling the channel element 3112 for thereby modulating a forward link channel in synchronization with the 1st even second clock signal.

The analog modulation unit 3120 includes a D/A converter 3122 for receiving a digital signal from the channel card 3110 and modulating into an analog signal, and a QPSK modulation unit 3126 for receiving an analog signal from the D/A converter 3122 and modulating a QPSK.

The second signal processing unit 3200 receives the 2nd even second clock signal from the clock generation unit 2000 and detects and demodulates the reverse direction link channel(connection channel and communication channel) from the mobile station 7000 to the base station 3000 in synchronization with the 2nd even second clock signal.

As shown in FIG. 3, the second signal processing unit 3200 includes more than one channel cards 3210 and an analog demodulation unit 3220.

The channel card 3210 includes more than one channel element 3212 including one set of the base station modem ASIC 3214 for demodulating a digital signal, and a channel card processor 3216 for controlling the channel element 3212 for thereby demodulating the reverse direction link channel in synchronization with the 2nd even second clock signal.

The analog demodulation unit 3220 includes a QPSK demodulation unit 3226 for receiving a RF signal from the RF receiving unit 3310 and QPSK-demodulating the same, and an A/D converter 3222 for receiving a QPSK from the QPSK demodulation unit 3226 and converting the received signal in a digital signal.

In addition, in the above, the first and second signal processing units 3100 and 3200 are separated. In another embodiment of the present invention, the first and second signal processing units 3100 and 3200 each includes one channel card and one analog modulation and demodulation unit. In addition, there are provided a plurality of channel elements of the channel card and one channel card processor for controlling the channel element. The channel element is designed to modulate and demodulate the forward channel and backward channel, respectively.

In addition, the analog modulation and demodulation unit includes a D/A converter for receiving a digital signal from the channel card and modulating into an analog signal, a QPSK modulation unit for receiving an analog signal from the D/a converter and QPSK-modulating the same, a QPSK demodulation unit for receiving a RF signal and QPSK-demodulating the same, and an A/D converter for receiving a QPSK demodulation signal from the QPSK demodulation unit and converting into a digital signal.

The RF signal processing unit 3300 includes a RF receiving unit 3310 for receiving a forward link channel signal from the first signal processing unit 3100 to the mobile station, modulating to a high frequency and outputting to the relay unit 4000, and a RF receiving unit 3320 for receiving a backward channel signal from the mobile station 7000 via the relay unit 4000, modulating to a low frequency and outputting to the second signal processing unit 3200.

In the drawing, reference numeral 5000 represents a transmission antenna of the relay unit 4000 which receives a RF signal from the relay unit 4000 and propagate toward the mobile station, and reference numeral 5100 represents an element for outputting a signal to the relay unit, and reference numeral 6000 represent a transmission/receiving antenna of the mobile station 7000.

The base station operation method for compensating a fixed route delay factor between a base station and a mobile station of a CDMA mobile communication system according to a first embodiment of the present invention.

Figure 5:
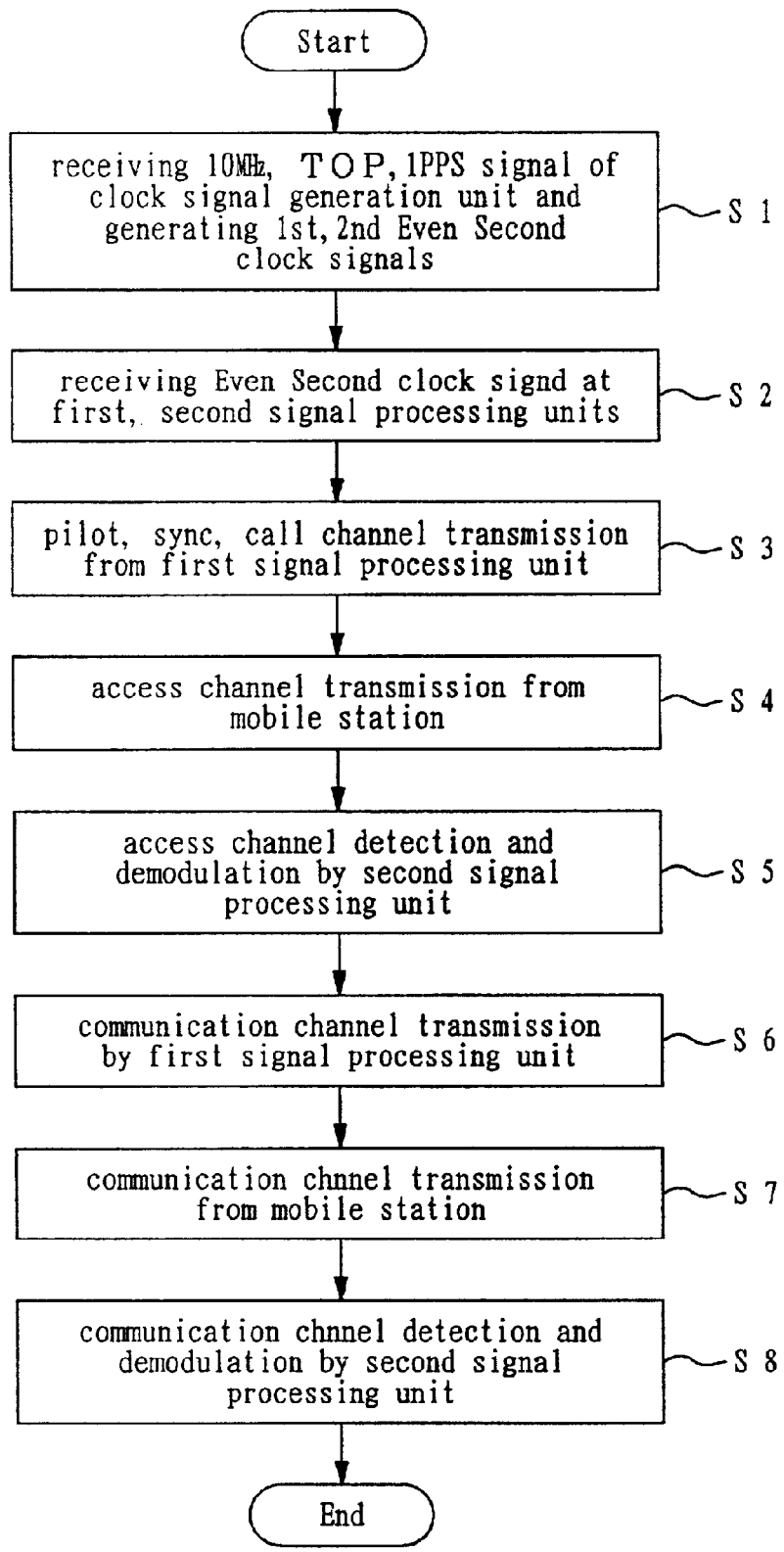
FIG. 5 is a flow chart illustrating a base station operation method for compensating a fixed route delay factor between a base station and a mobile station of a CDMA mobile communication system according to a first embodiment of the present invention.

FIG. 5 is a flow chart illustrating a base station operation method for compensating a fixed route delay factor between a base station and a mobile station of a CDMA mobile communication system according to a first embodiment of the present invention.

As shown therein, in Step S1, the clock signal generation unit 2000 receives a 10 MHz, TOD and 1 PPS signal from the GPS receiving unit 1000 and generates a 1st even second signal and a 2nd even second clock signal which is obtained by delaying a 1st even second clock signal in synchronization with the 1 PPS by the bidirectional propagation delay time between the base station and the relay unit 4000.

In Step S2, the first and second signal processing units 3100 and 3200 receive the first and second even second clock signals, respectively, and in Step S3, the first signal processing unit 3200 modulates a pilot channel synchronous channel and call channel in synchronization with the 1st even second clock signal and transmits to the mobile station 7000 via the RF signal processing unit 3300 and the relay unit 4000.

In Step S4, when transmitting am access channel from the mobile station 7000 to the base station 3000, in Step S5, the second signal processing unit 3200 receives the access channel of the reverse direction link via the relay unit 4000 and the RF signal processing unit 3300 and detects and demodulates the channel in synchronization with the 2nd even second clock signal.

In Step S6, a communication channel is allocated in the first signal processing unit 3100, and the first signal processing unit 3100 modulates and outputs the communication channel in synchronization with the 1st even second clock signal and transmits to the mobile station 7000 via the RF signal processing unit 3300 and the relay unit 4000.

In Step S7, the mobile station 7000 receives the communication channel and transmits the communication channel of the reverse direction link, and in Step S8, the second signal processing unit receives a communication channel of the reverse direction link via the relay unit 4000 and the RF signal processing unit 3300 and detects and demodulates the communication channel in synchronization with the 2nd even second clock signal for thereby implementing a communication between the mobile station 7000 and the base station 3000.

Figure 6:
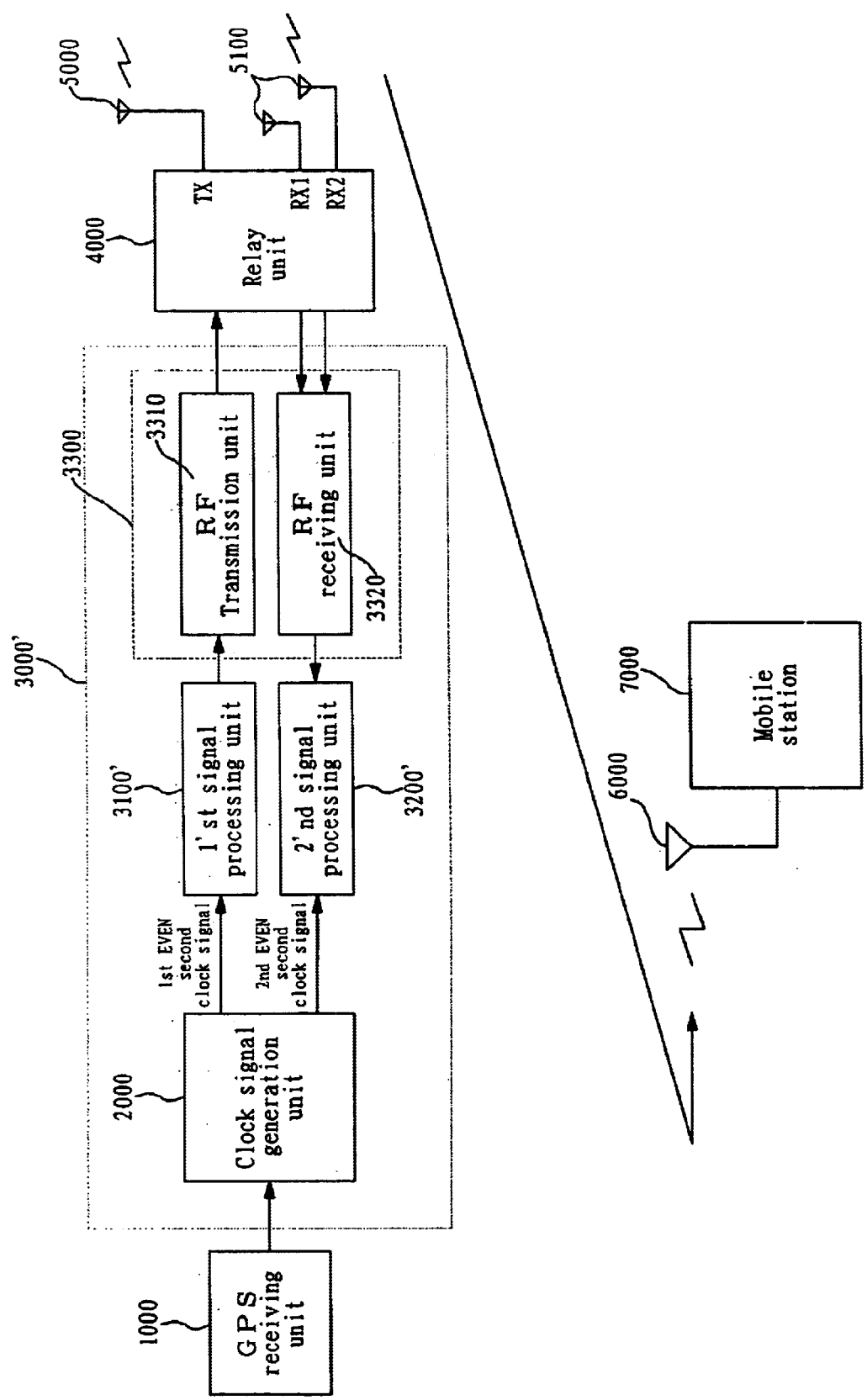
FIG. 6 is a block diagram illustrating a CDMA mobile communication system which adapts a base station for compensating a fixed route delay factor between a base station and a mobile station of a CDMA mobile communication system according to a second embodiment of the present invention.
Figure 7:
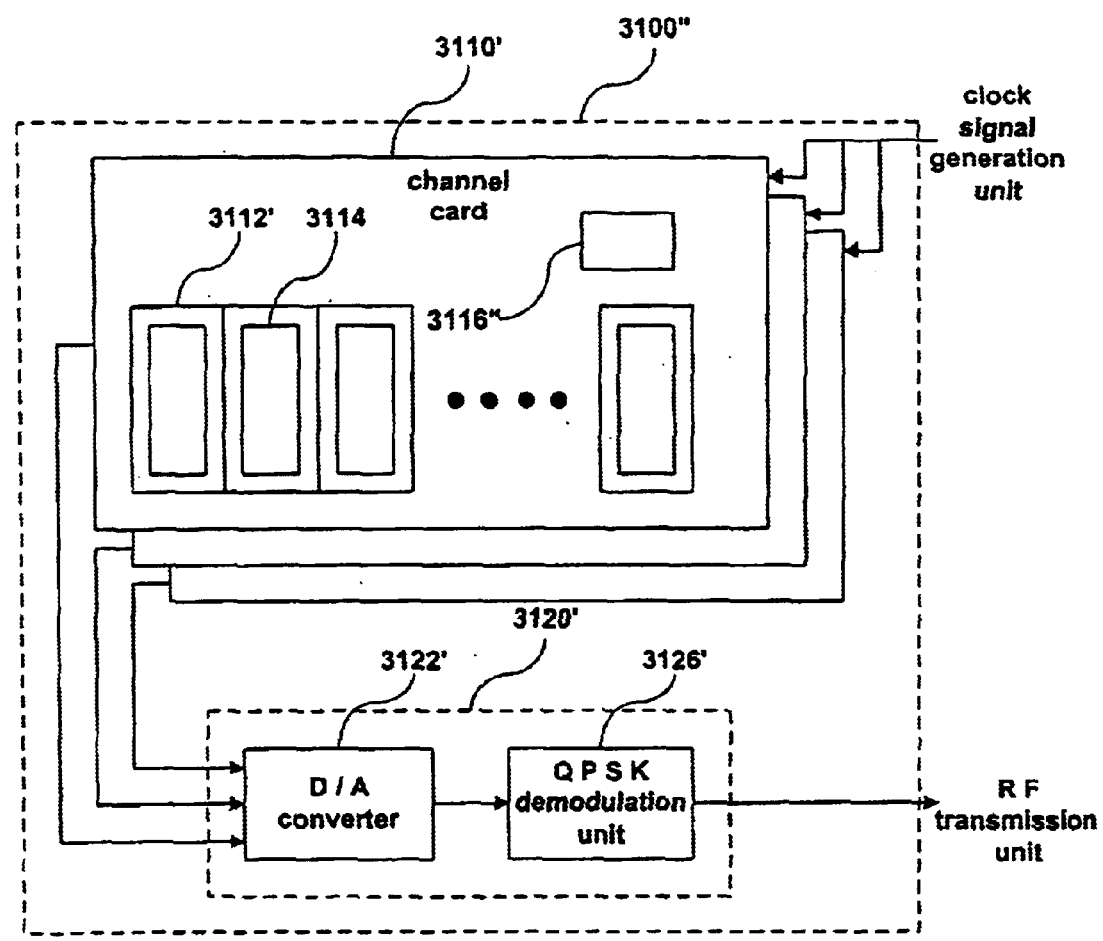
FIG. 7 is a detailed circuit diagram illustrating a 1'st signal processing unit of FIG. 6.
Figure 8:
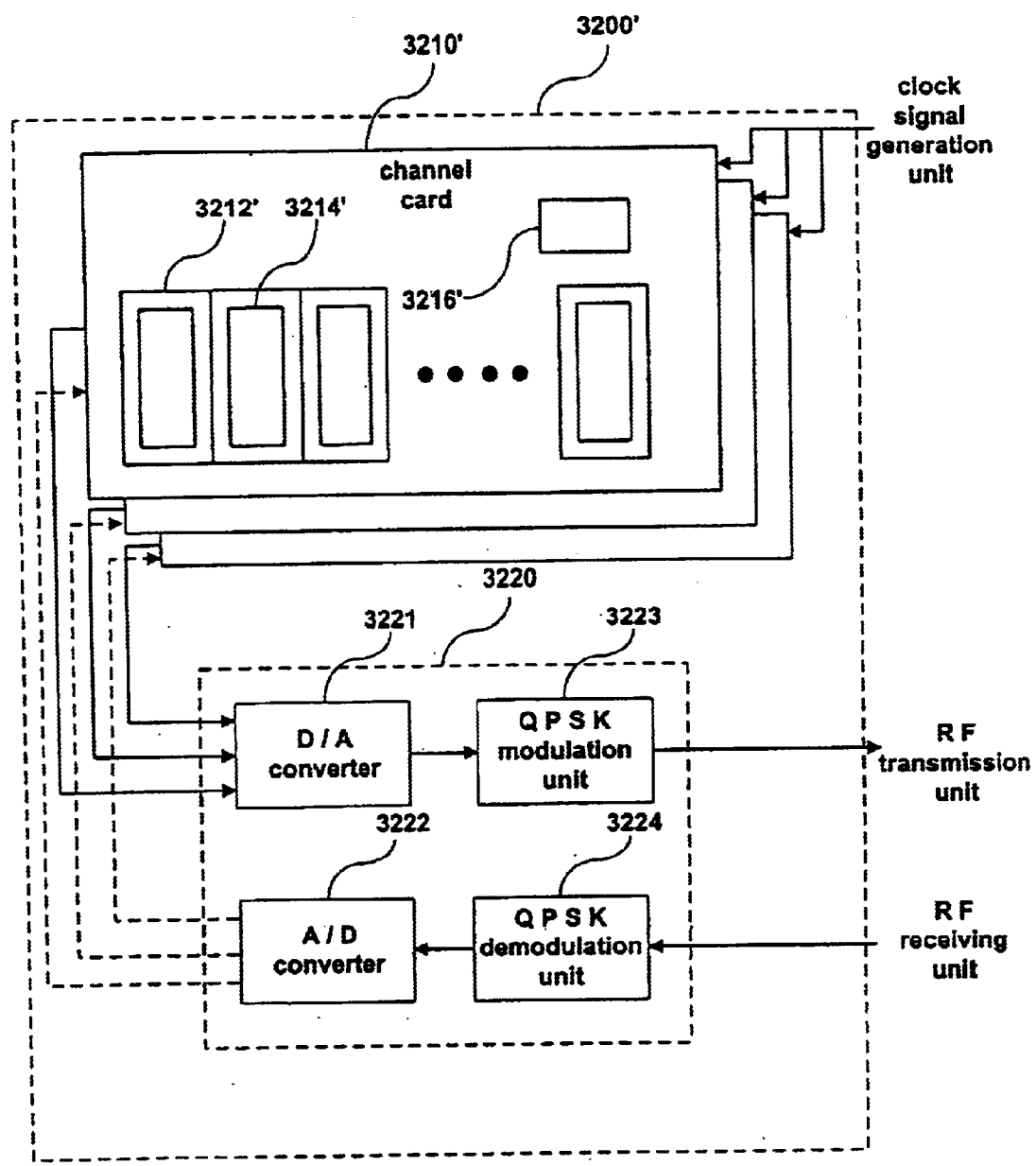
FIG. 8 is a detailed circuit diagram illustrating a 2'nd signal processing unit of FIG. 6.

FIG. 6 is a block diagram illustrating a CDMA mobile communication system which adapts a base station for compensating a fixed route delay factor between a base station and mobile station of a CDMA mobile communication system according to a second embodiment of the present invention, FIG. 7 is a detailed circuit diagram illustrating a 1'st signal processing unit of FIG. 6, and FIG. 8 is a detailed circuit diagram illustrating a 2'nd signal processing unit of FIG. 6.

As shown therein, the CDMA mobile communication system which adapts a base station for compensating a fixed route delay factor between a base station and a mobile station of a CDMA mobile communication system according to a second embodiment of the present invention includes a clock signal generation unit 2000, a base station 3000 having 1'st and 2'nd signal processing units 3100' and 3200', a relay unit 4000 and a mobile station 7000.

The relay unit 4000 and the mobile station 7000 are constituted in the same manner as the first embodiment of the present invention. The description thereof will be omitted. The vase station 3000' will be explained.

Figure 4:
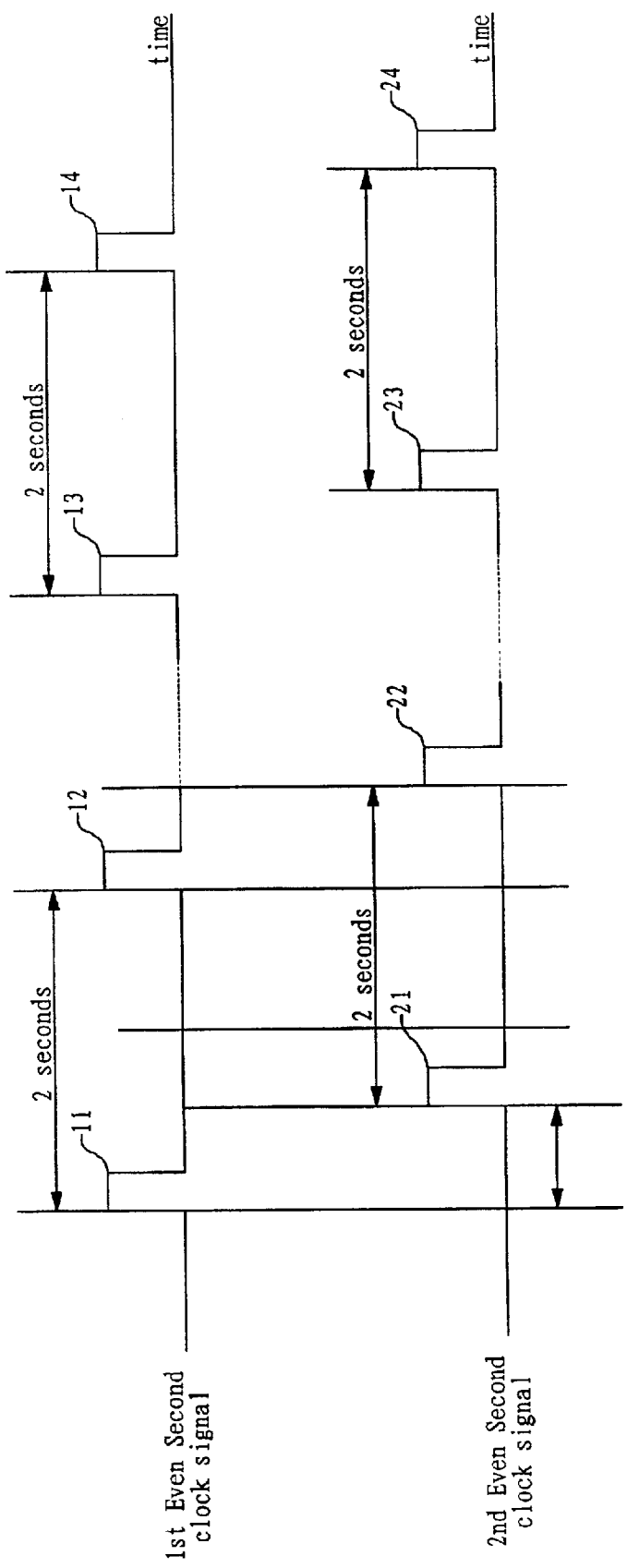
FIG. 4 is a view illustrating a relationship between an even second clock of a base station and a system time of a base station.

As shown in FIG. 4, the clock signal generation unit 2000 receives a 10 MHz, TOD and 1PPS signal from the GPS receiving unit 1000 and generates a 1st even second clock signal and a 2nd even second clock which is obtained by delaying the 1st even second clock signal in synchronization with the 1 PPS by the maximum bidirectional propagation delay time 30 between the base station 3000' and the relay unit 4000.

The 1 st signal processing unit 3100' receives a 1st even second clock signal from the clock signal generation unit 2000 and modulates a pilot channel, a synchronous channel and a call channel of the forward link from the base station 3000' to the mobile station 7000 in synchronization with the 1st even second clock signal and transmits the same.

As shown in FIG. 7, the 1'st signal processing unit 3100' is formed of more than one channel card 3110' and an analog modulation unit 3120'.

The channel card 3110' includes more than one channel element 3112' including one set of the base station modem ASIC 3114' for modulating the digital signal and a channel card processor 3116' for controlling the channel element 3112' for thereby modulating a pilot channel a synchronous channel and a call channel in synchronization with the 1st even second clock signal.

The analog modulation unit 3120 includes a D/A converter 3122' for receiving a digital signal from the channel card 3110' and converting into an analog signal, and a QPSK modulation unit 3126' for receiving an analog signal from the D/A converter 3122' and QPSK-modulating the same.

In addition, the 2'nd signal processing unit 3200' receives a 2nd even second clock signal from the clock signal generation unit 2000 and detects and modulates the reverse direction link channel from the mobile station 7000 to the base station 3000' in synchronization with the second even second clock signal and modulates the same by processing the communication channel of the forward link from the base station 3000' to the mobile station 7000 by expediting by the maximum bidirectional propagation delay time between the base station 3000' and the relay unit 4000'.

As shown in FIG. 8, the 2'nd signal processing unit 3200' includes more than one channel card 3210' and the analog modulation and demodulation unit 3220.

The channel card 3210' includes more than one channel element 3212' having one set of the base station modem ASIC 3214' for modulating and demodulating the digital signal, and a channel card processor 32161 for controlling the channel element 3212' and modulates the forward link communication channel by expediting by the maximum bidirectional propagation delay time between the base station 3000' and the relay unit 4000 and demodulates the backward link channel(access channel and communication channel).

The analog modulation and demodulation unit 3220 includes a D/A converter 3221 for receiving a digital signal from the channel card 3210' and converting into an analog signal, a QPSK modulation unit 3223 for receiving an analog signal from the D/A converter 3221 and QPSK-modulating the same, a QPSK modulation unit 3225 for receiving a RF signal and QPSK-modulating the same, and an A/D converter 3222 for receiving a QPSK demodulation signal from the QPSK demodulation unit 3224 and converting into a digital signal.

The RF signal processing unit 3300 includes a RF transmission unit 3310 for receiving a forward link channel signal from the 1'st and 2'nd signal processing units 3100' and 3200' to the mobile station 7000, processing to a high frequency and outputting to the relay unit 4000, and a RF receiving unit 3320 for receiving a backward channel signal from the mobile station 7000 via the relay unit 4000, modulating to a low frequency and outputting to the 2'nd signal processing unit 3200'.

In the above-described embodiment of the present invention, the 1'st and 2'nd signal processing units 3100' and 3200' are separated. In another embodiment of the present invention, the 1'st and 2'nd signal processing units 3100' and 3200' each may be formed of one channel card and one analog modulation and demodulation units.

The channel card is formed of a plurality of channel elements and one channel card processor for controlling the channel element. The channel elements modulates the communication channel of the pilot channel, the synchronous channel and the call channel of the forward link and modulates the communication channel of the forward link and demodulates the backward link channel.

The analog modulation and demodulation unit includes a D/A converter for receiving a digital signal from the channel card and converting into an analog signal, a QPSK modulation unit for receiving an analog signal from the D/A converter and QPSK-modulating the same, a QPSK demodulation unit for receiving a RF signal and QPSK-demodulating the same and an A/D converter for receiving a QPSK demodulation signal from the QPSK demodulation unit and converting into the digital signal.

The operation for expediting or delaying the even second clock signal at the modem ASIC of the signal processing unit of the base station will be explained with reference to FIG. 4.

The clock generation unit receives a 10 MHz, TOD and 1 PPS signal from the GPS receiving unit and outputs a 1st even second clock signal and a 2nd even second clock signal which is obtained by delaying the 1st even second clock signal for a certain time (30, the maximum bidirectional propagation delay time between the base station and the relay unit), and a TOD including a time A.

Assuming that the signal processing unit of the base station receives the TOD at the time 50 after the pulse of the 1st even second clock signal and the 2nd even second clock signal, in the system which uses the 1st even second clock signal, after the TOD is received, the base station system time of the timing 51 of the 1st even second clock signal becomes the time A.

The base system time of the timing 52 of the pulse 22 of the 2nd even second clock signal becomes the time A.

Namely, the system time may be expedited or delayed based on the absolute CDMA system time TOD by expediting or delaying the even second clock signal.

The base station operation method for compensating a fixed route delay factor between a base station and a mobile station of a CDMA mobile communication system according to a second embodiment of the present invention will be explained with reference to the accompanying drawings.

Figure 9:
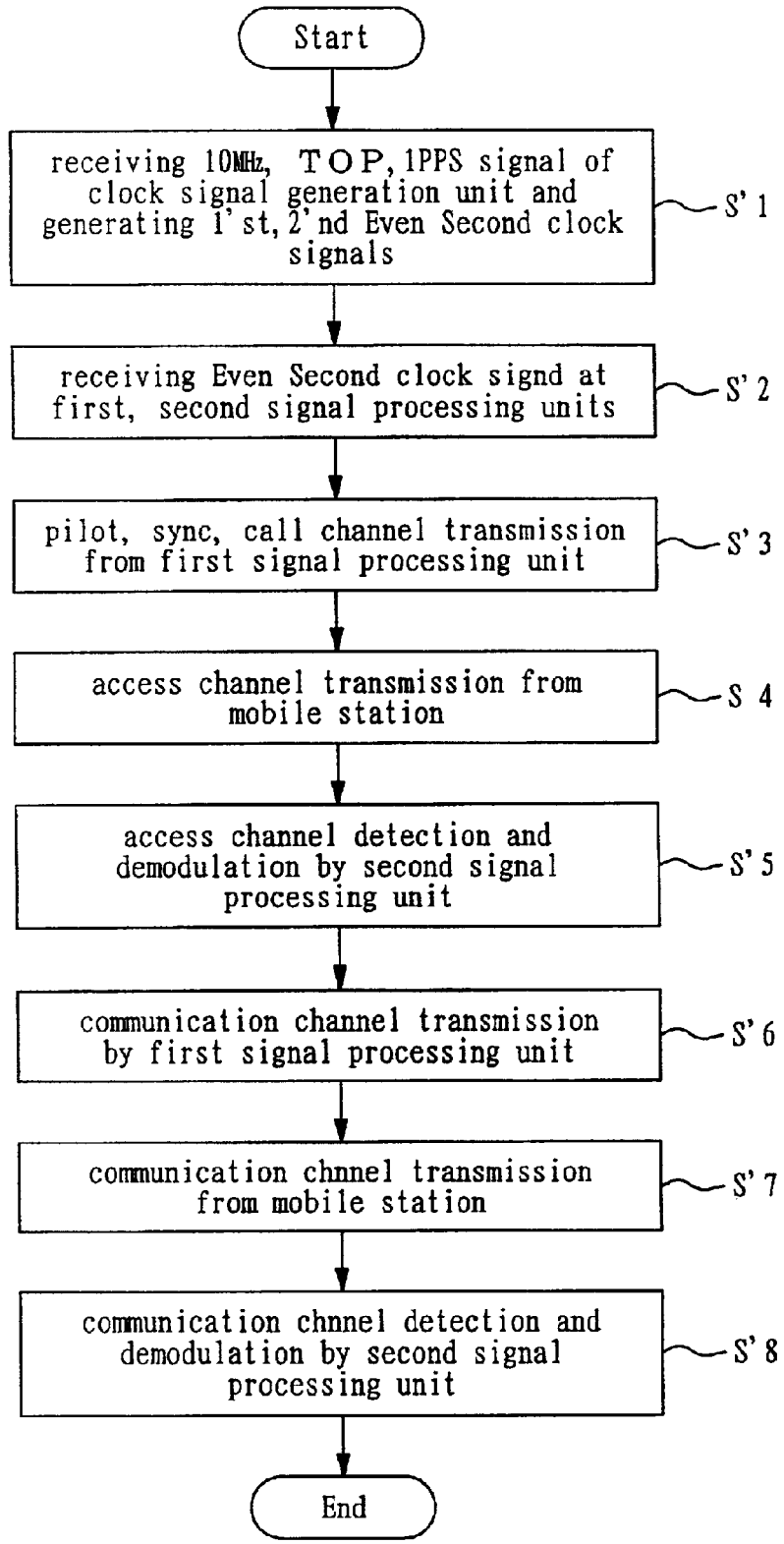
FIG. 9 is a flow chart illustrating a base station operation method for compensating a fixed route delay factor between a base station and a mobile station of a CDMA mobile communication system according to a second embodiment of the present invention.

FIG. 9 is a flow chart illustrating a base station operation method for compensating a fixed route delay factor between a base station and a mobile station of a CDMA mobile communication system according to a second embodiment of the present invention.

As shown therein, in Step S'1, the clock generation unit 2000 receives a 10 MHz, TOD and 1 PPS signal from the GPS receiving unit 1000 and generates a 1st even second clock signal in synchronization with the 1 PPS and a 2nd even second clock signal which is obtained by delaying the 1 even second clock signal by the maximum bidirectional propagation delay time between the base station 3000' and the relay unit 4000.

In Step S'2, the 1'st and 2'nd signal processing units 3100' and 3200' receive the first and second even second clock signals, and in Step S'3, the 1'st signal processing unit 3100' modulates the pilot channel synchronous channel and call channel from the base station 3000' to the mobile station 7000 in synchronization with the 0.1st even second clock signal and transmits to the mobile station 7000 via the RF signal processing unit 3300 and the relay unit 4000.

In Step S'4, when the mobile station 7000 receives an access channel, the 2'nd signal processing unit 3200' receives the access channel of the backward link via the relay unit 4000 and the RF signal processing unit 3300, and in Step S'5, the mobile station 7000 detects the same in synchronization with the 2nd even second clock signal.

In Step S'6, the 2'nd signal processing unit 3200' modulates the communication channel of the forward link from the base station 3000' to the mobile station 7000 by expediting by the maximum bidirectional propagation delay time between the base station 3000' and the relay unit 4000 and transmits to the mobile station 7000 via the RF signal processing unit 3300 and the relay unit 4000.

In Step S'7, the mobile station 7000 receives the communication channel and transmits the communication channel of the backward link to the base station 3000'. In Step S'8, the 2'nd signal processing unit 3200' receives the communication channel of the backward link via the relay unit 4000 and the RF signal processing unit 3300 and detects and demodulates the same in synchronization with the 2nd even second clock signal for thereby implementing a communication between the mobile station 7000 and the base station 3000'.

Figure 10:
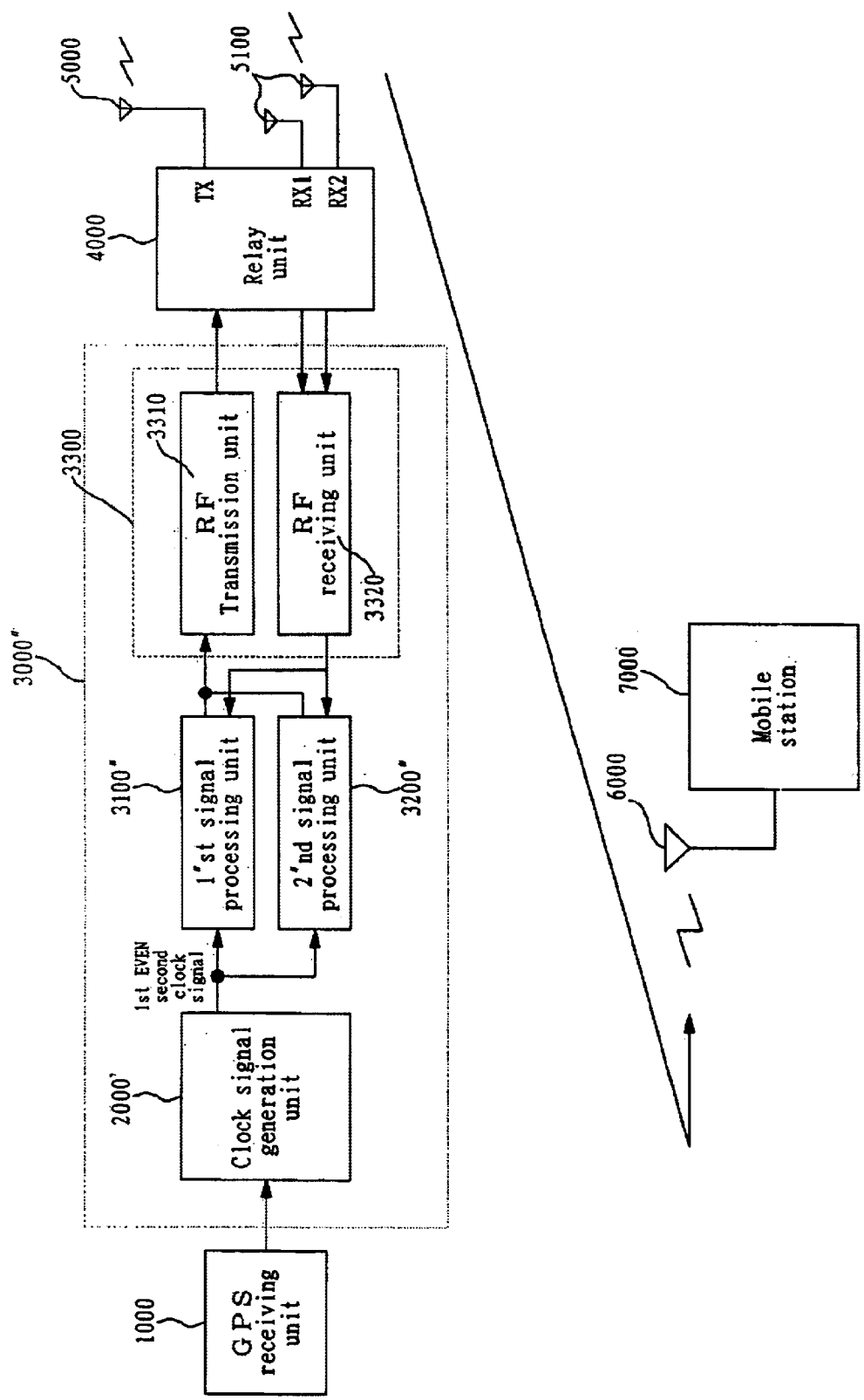
FIG. 10 is a block diagram illustrating a CDMA mobile communication system which adapts a base station for compensating a fixed route delay factor between a base station and a mobile station of a CDMA mobile communication system according to a third embodiment of the present invention.
Figure 11:
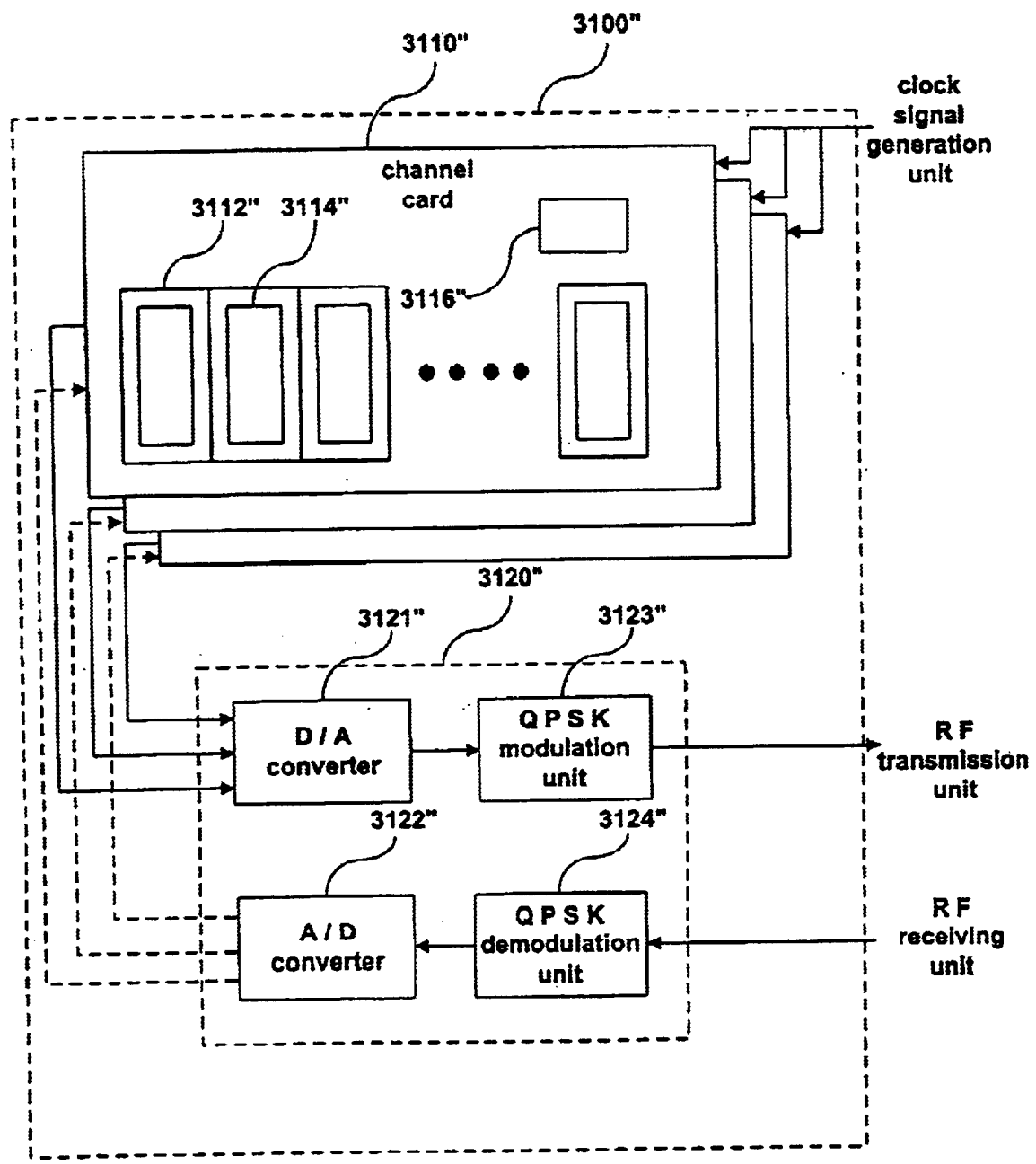
FIG. 11 is a detailed circuit diagram illustrating a 1"st signal processing unit of FIG. 10.
Figure 12:
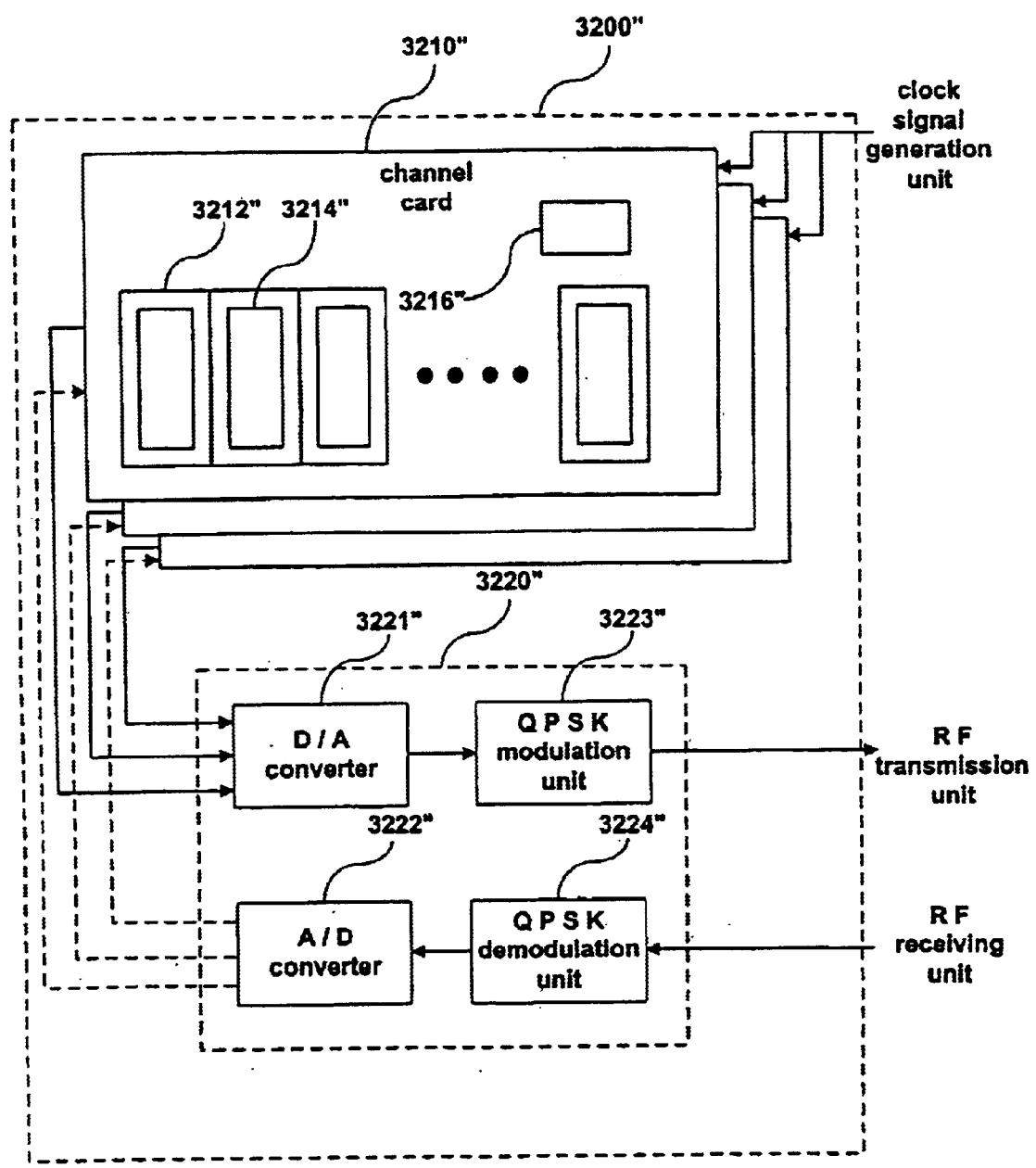
FIG. 12 is a detailed circuit diagram illustrating a 2"nd signal processing unit of FIG. 10.

FIG. 10 is a block diagram illustrating a CDMA mobile communication system which adapts a base station for compensating a fixed route delay factor between a base station and a mobile station of a CDMA mobile communication system according to a third embodiment of the present invention, FIG. 11 is a detailed circuit diagram illustrating a 1"st signal processing unit of FIG. 10, and FIG. 12 is a detailed circuit diagram illustrating a 2"nd signal processing unit of FIG. 10.

As shown therein, the CD mobile communication system which adapts a base station for compensating a fixed route delay factor between a base station and a mobile station of a CDMA mobile communication system according to a third embodiment of the present invention includes a clock signal generation unit 2000', a base station 3000" formed of 1"st and 2"nd signal processing units 3100" and 3200", a relay unit 4000 and a mobile station 7000.

The relay unit 4000 and the mobile station 7000 are constituted in the same manner as the first embodiment of the present invention. Therefore, the description thereof will be explained except for the base station 3000".

As shown in FIG. 4, the clock signal generation unit 2000' receives a 10 MHz, TOD and 1 PPS signal from the GPS receiving unit 1000 and generates a 1st even second clock signal in synchronization with the 1PPS.

The 1'st signal processing unit 3100'" receives a 1st even second clock signal from the clock generation unit 2000' modulates the pilot channel, synchronous channel and call channel from the base station 3000" to the mobile station 7000 by expediting the same by the maximum bidirectional propagation delay time between the base station 3000" and the relay unit 4000 and receives the access channel of the backward link from the mobile station 7000 to the base station 3000" via the RF signal processing unit 3300 and detects and demodulates the channel in synchronization with the 1st even second clock signal.

As shown in FIG. 11, the 1"st signal processing unit 3100" includes more than one channel card 3100" and an analog modulation and demodulation unit 3120".

The channel card 310" includes more than one channel element 3112" having one set of the base station modem ASIC 3112" for modulating and demodulating a digital signal, and a channel card processor 3110" for controlling the channel element 3112" and modulates the pilot channel, synchronous channel and call channel of the forward link from the base station 3000" to the mobile station 7000 by expediting by the maximum bidirectional propagation delay time between the base station 3000" and the relay unit 4000 and detects and demodulates the access channel of the backward link from the mobile station 7000 to the base station 3000" in synchronization with the 1st even second clock signal.

The analog modulation and demodulation unit 3120' includes a D/A converter 3121" for receiving a digital signal from the channel card 3110" and modulating into an analog signal, a QPSK modulation unit 3123" for receiving an analog signal from the D/A converter 3121' and QPSK-modulating the same, a QPSK-demodulation unit 3124' for receiving a RF signal from the RF signal processing unit 3300 and QPSK-demodulating the same, and an A/D converter 3122' for receiving a QPSK demodulation signal from the QPSK demodulation unit 3124", converting into a digital signal and transmitting to the channel card 3110".

In addition, the 2'nd signal processing unit 3200" receives a 1st even second clock signal from the clock signal generation unit 2000' and modulates the communication channel of the forward link from the base station 3000" to the mobile station 7000 by expediting by the maximum bidirectional propagation delay time between the base station 3000" to the relay unit 4000 and receives a communication channel of the backward link from the mobile station 7000 to the base station 3000" through the relay unit 4000 and the RF signal processing unit 3300 and detects and demodulates the same in synchronization with the 1st even second clock signal.

As shown in FIG. 12, the 2"nd signal processing unit 3200" includes more than one channel card 3210" and an analog modulation and demodulation unit 3220".

The channel card 3210" includes more than one channel element 3212∝ having one set of the base station modem ASIC 3214" for modulating and demodulating a digital signal, and a channel card processor 3216" for controlling the channel element 3212" and modulates the forward link communication channel from the base station 3000" to the mobile station 7000 by expediting by the maximum bidirectional propagation delay time between the base station 3000" and the relay unit 4000 and detects and demodulates the communication channel of the backward link in synchronization with the 1st even second clock signal.

The analog modulation and demodulation unit 3220" includes a D/A converter 3221" for receiving a digital signal and modulating into an analog signal, a QPSK modulation unit 3223"1' for receiving an analog signal from the D/A converter 3221", QPSK-modulating the same and transmitting to the RF signal processing unit 3300, a QPSK demodulation unit 3224" for receiving a RF signal from the RF signal processing unit 3300 and QPSK-demodulating the same, and an A/d converter 3222" for receiving a QPSK demodulation signal from the QPSK demodulation unit 3224", converting into a digital signal and transmitting to the channel card 3210".

In the above-described embodiment of the present invention, the 1"st and 2"nd signal processing units 3100 and 3200" are separated each other. In another embodiment of the present invention, the 1"st and 2"nd signal processing units 3100" and 3200" each may include one channel card and one analog modulation and demodulation unit.

The 1"st and 2"nd signal processing units each include one channel card and one analog modulation and demodulation unit. The channel card includes a plurality of channel elements, and a channel card processor for controlling the channel elements.

The channel elements modulate the pilot channel, synchronous channel and call channel of the forward link, modulates the access channel of the backward link, modulates the communication channel of the forward link and demodulates the communication channel of the backward link.

The analog modulation and demodulation unit includes a D/A converter for receiving a digital signal from the channel card, a Ad 15. QPSK modulation unit for receiving an analog signal from the D/A converter and QPSK-modulating the same, a QPSK demodulation unit for QPSK-demodulating the same and an A/D converter for receiving a QPSK demodulation signal from the QPSK demodulation unit and converting into a digital signal.

The RF signal processing unit 3300 includes a RF transmission unit for receiving a forward link channel signal from the 1"st and 2"nd signal processing units 3100" and 3200" to the mobile station 7000, modulating to a high frequency and outputting to the relay unit 4000, and a RF receiving unit 3320 for receiving a backward channel signal from the mobile station 7000 via the relay unit 4000, modulating to a low frequency and outputting to the 1"st and 2"nd signal processing units 3100" and 3200".

The base station operation method for compensating a fixed route delay factor between a base station and a mobile station of a CDMA mobile communication system according to a third embodiment of the present invention will be explained with reference to the accompanying drawings.

Figure 13:
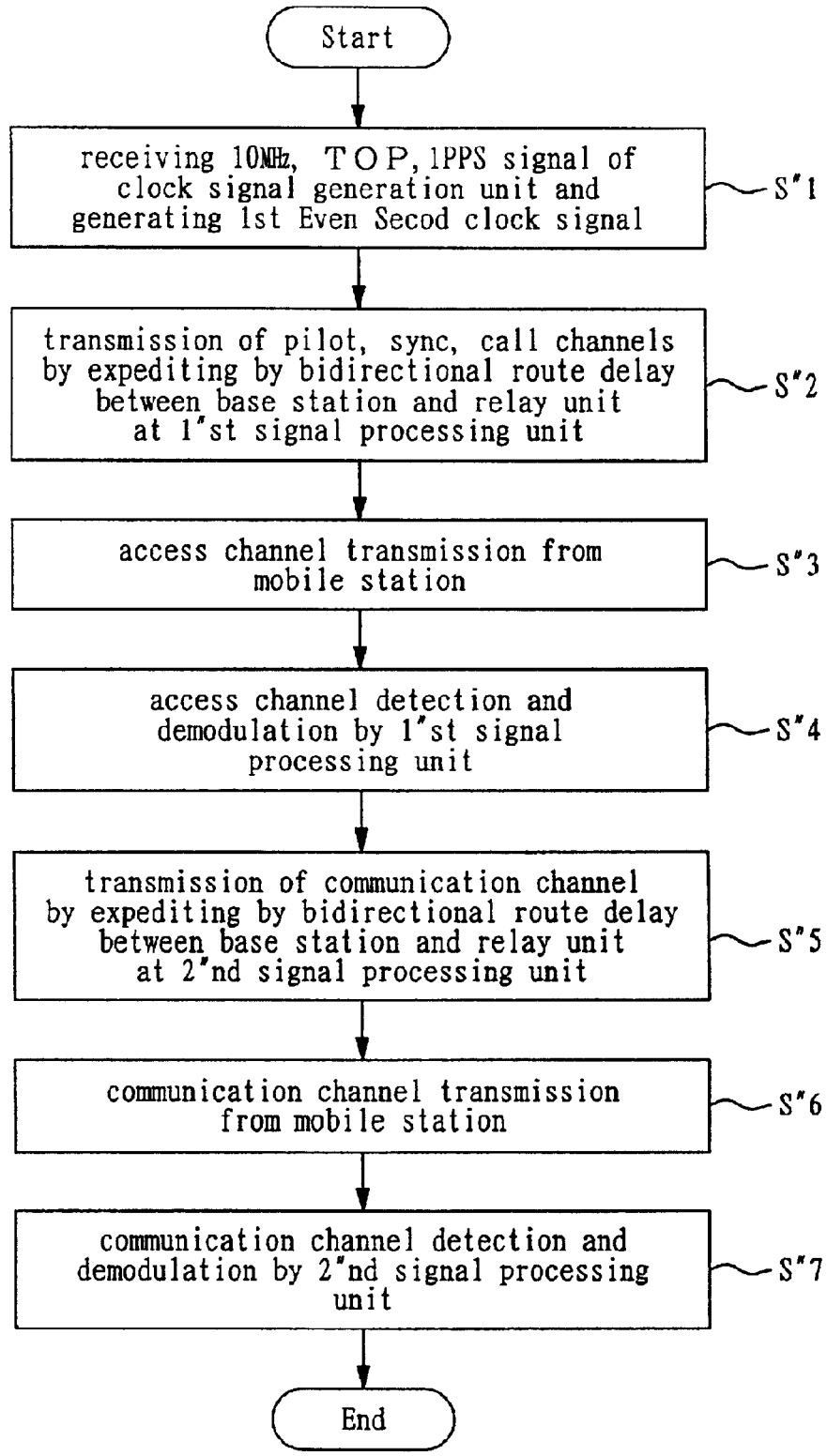
FIG. 13 is a flow chart illustrating a base station operation method for compensating a fixed route delay factor between a base station and a mobile station of a CDMA mobile communication system according to a third embodiment of the present invention.

FIG. 13 is a flow chart illustrating a base station operation method for compensating a fixed route delay factor between a base station and a mobile station of a CDMA mobile communication system according to a third embodiment of the present invention.

In Step S"1, the clock signal generation unit 200' receives a 10 MHz, TOD and 1 PPS signal and generates a 1 even second clock signal in synchronization with the 1 PPS.

At this time, in Step S"2, the 1"st and 2"nd signal processing units 3100" and 3200" receive the 1st even second clock signal, and the 1"st signal processing unit 3100" modulates the pilot channel, synchronous channel and call channel by expediting by the maximum bidirectional delay time between the base station 3000" and the relay unit 4000 and transmits to the mobile station 7000 via the RF signal processing unit 3000 and the relay unit 4000.

In Step S"3, the mobile station 7000 transmits an access channel for connecting with the base station 3000", and in Step S"4, the 1"st signal processing unit 3100" detects and demodulates the access channel from the mobile station 7000 in synchronization with the 1st even second clock signal.

At this time, in Step S"5, the 2"nd signal processing unit 3200" modulates the forward link communication channel from the base station 3000" to the mobile station 7000 by expediting by the maximum bidirectional propagation delay time between the base station 3000" and the relay unit 4000 and transmits the same to the mobile station 7000 via the RF signal processing unit 3300.

In Step S"6, when the mobile station 7000 transmits the communication channel, in Step S"7, the 2"nd signal processing unit 3200" detects a communication channel from the mobile station 7000 in synchronization with the 1st even second clock signal for thereby implementing a communication between the mobile station 7000 and the base station 3000".

In the above-described embodiment of the present invention, in the clock generation unit, the 1st even second clock signal is generated in synchronization with the 10 MHz, TOD and 1PPS of the GPS receiving unit of the, and the 2nd even second clock signal is generated by delaying the 1st even second clock signal by the maximum bidirectional propagation delay time between the base station and the relay unit. However, in another embodiment of the present invention, the 1st even second clock signal, and the even second clock signal which is generated by expediting the 1st even second clock signal by the maximum bidirectional propagation delay time between the base station and the relay unit may be generated for use in the base station.

When using the system reference clock signal of the base station according to the present invention, the even second clock signal which is in synchronization with the 1PPS received from the GPS receiving unit is used with respect to the forward channel from the base station to the mobile station. The even second clock signal is delayed by the maximum bidirectional propagation delay time between the base station and the relay unit with respect to the backward channel from the mobile station to the base station or the even second clock signal which is not delayed in the system of the base station is received, and the clock signal is expedited with respect to the forward channel using a timing compensation register in the modem ASIC, and the clock signal which is not delayed is used with respect to the backward channel, so that it is possible to prevent a decrease of the cell radius range and communication failure which are generated due to an additional fixed route delay factor between the base station and the mobile station such as at the relay unit.

In addition, in the present invention, since it is possible to prevent a decrease of the cell communication radius and a communication failure problem, the adaptability of the relay system such as a relay unit or satellite is enhanced for expanding the maximum radius of the base station.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In a base station of a Code Division Multiple Access (CDMA) mobile communication system capable of compensating a route delay factor on a communication route between a base station and a mobile station such as on a relay unit, a base station for compensating a route delay factor fixed between a base station and a mobile station of a CDMA mobile communication system, comprising:

a clock signal generation unit for receiving a 10 MHZ, Time Of Day (TOD) and 1 Pulse Per Second (PPS) signal from a Global Positioning System (GPS) receiving unit and generating a 1st even second clock signal in synchronization with the 1 PPS and a 2nd even second clock signal which is obtained by delaying the 1st even second clock signal by a maximum bidirectional propagation delay time between a base station and a relay unit;

a first signal processing unit for receiving the 1st even second clock signal from the clock signal generation unit and modulating a forward link channel from the base station to a mobile station in synchronization with the 1st even second clock signal; and a second signal processing unit for receiving the 2nd even second clock signal from the clock signal generation unit and demodulating a backward link channel from the mobile station to the base station in synchronization with the 2nd even second clock signal.

2. The base station of claim 1, wherein said first signal processing unit includes:

channel elements including a set of base station modem Application Specific Integrated Circuits (ASICs) for modulating a digital signal;

channel cards formed of a channel card for controlling the channel element and for modulating a forward link channel; and an analog demodulation unit including a Digital to Analog (D/A) converter for receiving a digital signal from the channel card and a Quadrature Phase Shift Keying (QPSK) modulation unit for receiving an analog signal from the D/A converter and QPSK-modulating the received analog signal.

3. The base station of claim 1, wherein said second signal processing unit includes:

channel cards including channel elements having a set of base station modem ASICs for demodulating a digital signal and a channel card processor for controlling the channel element; and an analog demodulation unit having a Quadrature Phase Shift Keying (QPSK) demodulation unit for receiving a Radio Frequency (RF) signal and QPSK-demodulating the received RF signal and an Analog to Digital (A/D) converter for receiving a QPSK demodulation signal from the QPSK demodulation unit and converting the received QPSK demodulation signal into a digital signal.

4. The base station of claim 1, wherein said first and second signal processing units each include a channel card and an analog modulation and demodulation unit, and said channel card is formed of a plurality of channel elements and a channel card processor for controlling the channel element, and said channel elements are divided into two parts in which a forward channel and backward channel are modulated and demodulated, respectively, and said analog modulation and demodulation includes a Digital to Analog (D/A) converter for receiving a digital signal from the channel card and converting the received digital signal into an analog signal, a Quadrature Phase Shift Keying (QPSK) modulation unit for receiving an analog signal from the D/A converter and the QPSK-modulating the received analog signal, a QPSK-demodulator for receiving a Radio Frequency (RF) signal and the QPSK-demodulating the received RF signal and an A/D converter for receiving a QPSK demodulation signal from the QPSK demodulator and converting the QPSK demodulation signal into a digital signal.

5. The base station of claim 1, further comprising a Radio Frequency (RF) signal processing means connected between the first and second signal processing units and the relay unit and having a RF transmission unit for receiving a forward link channel from the first signal processing unit and modulating to a high frequency and a RF receiving unit for receiving a backward channel signal from the relay unit and modulating to a low frequency.

6. A base station operation method for compensating a fixed route delay factor between a base station and a mobile station of a Code Division Multiple Access (CDMA) mobile communication system, comprising the steps of:

a first step in which a clock generation unit receives a 10 MHz, Time Of Day (TOD), and 1 Pulse Per Second (PPS) from a Global Positioning System (GPS) receiving unit and generates a 1st even second clock signal in synchronization with the 1 PPS and a 2nd even second clock signal obtained by delaying the 1st even second clock signal by a maximum bidirectional propagation delay time between the base station and a relay unit;

a second step in which first and second signal processing units receive 1 st and 2nd even second clock signals and modulate a pilot channel, a synchronous channel and a call channel from the first signal processing unit in synchronization with the 1st even second clock signal;

a third step in which when an access channel is transmitted from the mobile station, the second signal processing detects and demodulates the access channel from the mobile station in synchronization with the 2nd even second clock signal;

a fourth step in which the first signal processing unit modulates a communication channel in synchronization with the 1st even second clock signal; and a fifth step in which when a communication channel is transmitted from the mobile station, the second signal processing unit detects and demodulates the communication channel from the mobile station in synchronization with the 2nd even second clock signal.

7. In a base station of a Code Division Multiple Access (CDMA) mobile communication system capable of compensating a route delay factor on a communication route between a base station and a mobile station such as on a relay unit, a base station for compensating a route delay factor fixed between a base station and a mobile station of a CDMA mobile communication system, comprising:

a clock signal generation unit for receiving a 10 MHz, Time Of Day (TOD) and 1 Pulse Per Second (PPS) signal from a Global Positioning System (GPS) receiving unit and generating a 1st even second clock signal in synchronization with the 1 PPS and a 2nd even second clock signal which is obtained by delaying the 1 st even second clock signal by a maximum bidirectional propagation delay time between a base station and a relay unit;

a first signal processing unit for receiving the 1st even second clock signal from the clock signal generation unit and modulating a pilot channel, a synchronous channel and a call channel of a forward link from the base station to a mobile station in synchronization with the 1st even second clock signal; and a second signal processing unit for detecting a communication channel from the clock signal generation unit in synchronization with the 2nd even second clock signal and modulating the communication channel of the forward link from the base station to the mobile station by expediting by the maximum bidirectional propagation delay time between the base station and the relay unit.

8. The base station of claim 7, wherein said first signal processing unit includes:

channel cards, each including channel elements having a set of base station modem Application Specific Integrated Circuits (ASICs) for modulating a digital signal and a channel card processor for controlling the channel element and for modulating a pilot channel, a synchronous channel and a call channel of the forward link; and an analog modulation unit which includes a Digital to Analog (D/A) converter for receiving a digital signal from the channel card and converting the received digital signal into an analog signal, and a Quadrature Phase Shift Keying (QPSK) modulation unit for receiving an analog signal from the D/A converter and QPSK-modulating the received analog signal.

9. The base station of claim 7, wherein said second signal processing unit includes:

channel cards, each including channel elements having a set of base station modem Application Specific Integrated Circuits (ASICs) for demodulating a digital signal and a channel card for controlling the channel element and for modulating a communication channel of a forward link by expediting by a maximum bidirectional propagation delay time; and an analog modulation and demodulation unit which includes a Digital to Analog (D/A) converter for receiving a digital signal from the channel card and converting the received digital signal into an analog signal, a QPSK modulator for receiving an analog signal from the D/A converter and QPSK-modulating the received analog signal, a QPSK demodulation unit for receiving a Radio Frequency (RF) signal and QPSK-demodulating the received RF signal, and an A/D converter for receiving a QPSK demodulation signal from the QPSK demodulation unit and converting the QPSK demodulation signal into a digital signal.

10. The base station of claim 7, wherein said first and second signal processing units include a channel card and an analog modulation and demodulation unit, and said channel card includes a plurality of channel elements and a channel card processor for controlling the channel elements, and said channel elements are divided into three portions in which a first portion of the three portions modulates a pilot channel, a synchronous channel and a call channel of a forward link, a second portion modulates a communication channel of the forward link and a third portion modulates a backward link channel, and said analog modulation and demodulation unit includes a Digital to Analog (D/A) converter for receiving a digital signal from the channel card and converting the received digital signal into an analog signal, a QPSK modulation unit for receiving the analog signal from the D/A converter and QPSK-modulating the received analog signal, a QPSK demodulation unit for receiving a Radio Frequency (RF) signal and QPSK-demodulating the received RF signal, and an Analog to Digital (A/D) converter for receiving a QPSK demodulation signal from the QPSK demodulation unit and converting the received QPSK demodulation signal into a digital signal.

11. The base station of claim 7, further comprising a Radio Frequency (RF) signal processing means connected between the first and second signal processing units and a relay unit and having a RF transmission unit for receiving a forward link channel from the first and second signal processing units and modulating to a high frequency, and a RF receiving unit for receiving a backward channel signal from the relay unit for modulating to a low frequency.

12. A base station operation method for compensating a fixed route delay factor between a base station and a mobile station of a Code Division Multiple Access (CDMA) mobile communication system, comprising the steps of:

a first step in which a clock signal generation unit receives a 10 MHz, Time Of Day (TOD) and 1 Pulse Per Second (PPS) signal from a Global Positioning System (GPS)

receiving unit and generates a 1st even second clock signal in synchronization with the 1PPS and a 2nd even second clock signal by delaying the 1st even second clock signal by the maximum bidirectional propagation delay time between a base station and a relay unit;

a second step in which first and second signal processing units receive 1st and 2nd even second clock signals and modulate a pilot channel, a synchronous channel and a call channel from the first signal processing unit in synchronization with the 1st even second clock signal;

a third step when an access channel is transmitted from the mobile station, the second signal processing unit detects and demodulates an access channel from the mobile station in synchronization with the 2nd even second clock signal;

a fourth step in which the second signal processing unit modulates a communication channel of a forward link from a base station to a mobile station by expediting by the maximum bidirectional delay time between a base station and a relay unit; and a fifth step in which when a communication channel is transmitted from the mobile station, the second signal processing unit detects and demodulates a communication channel from the mobile station in synchronization with the 2nd even second clock signal.

13. In a base station of a Code Division Multiple Access (CDMA) mobile communication system for compensating a router delay factor on a communication route between a base station and a mobile station such as a relay unit, a base station for compensating a fixed route delay factor between a base station and a mobile station of a CDMA mobile communication system, comprising:

a clock signal generating unit for receiving a 10 MHz, Time Of Day (TOD) and 1 Pulse Per Second (PPS) signal from a Global Positioning System (GPS) receiving unit and generating a 1st even second clock signal in synchronization with the 1 PPS;

a first signal processing unit for receiving the 1st even second clock signal from the clock signal generation unit, modulating a pilot channel, a synchronous channel and a call channel of a forward link from a base station to a mobile station by expediting by the maximum bidirectional propagation delay time and detecting and demodulating an access channel of the backward link from the mobile station to the base station in synchronization with the 1st even second clock signal; and a second signal processing unit for receiving the 1st even second clock signal from the clock signal generation unit, modulating a communication channel of a forward link from the base station to the mobile station by expediting by the maximum bidirectional propagation delay time between the base station and the relay unit and detecting and demodulating a communication channel of a backward link from the mobile station to the base station in synchronization with the 1st even second clock signal.

14. The base station of claim 13, wherein said first signal processing unit includes:

channel cards, each including channel elements having a set of base station modem Application Specific Integrated Circuits (ASICs) for modulating and demodulating a digital signal, and a channel card processor for controlling the channel element and for modulating a pilot channel, a synchronous channel and a call channel of a forward link by expediting by the maximum bidirectional propagation time between the base station and the relay unit; and an analog modulation and demodulation unit which includes a Digital to Analog (D/A) converter for receiving a digital signal from the channel card and converting the received digital signal from the channel card into an analog signal, a Quadrature Phase Shift Keying (QPSK) modulation unit for receiving the analog signal from the D/A converter and QPSK-modulating the received analog signal, a QPSK demodulation unit for receiving a Radio Frequency (RF) signal and QPSK-demodulating the received RF signal, and an Analog to Digital (A/D) converter for receiving a QPSK demodulation signal from the QPSK demodulation unit and converting the QPSK demodulation signal into a digital signal.

15. The base station of claim 13, wherein said second signal processing unit includes:

channel cards, each including channel elements having a set of base station modem Application Specific Integrated Circuits (ASICs) for modulating and demodulating a digital signal, and a channel card processor for controlling the channel element, for modulating a communication channel of a forward link and for detecting and demodulating a communication channel of a backward link; and an analog modulation and demodulation unit which includes a Digital to Analog (D/A) converter for receiving a digital signal from the channel card and converting the received digital signal into an analog signal, a Quadrature Phase Shift Keying (QPSK) modulation unit for receiving the analog signal from the D/A converter and QPSK-modulating the received analog signal, a QPSK demodulation unit for receiving a radio frequency (RF) signal and QPSK-demodulating the received RF signal, and an Analog to Digital (A/D) converter for receiving a QPSK demodulation signal from the QPSK demodulation unit and converting the QPSK demodulation signal into a digital signal.

16. The base station of claim 13, wherein said first and second signal processing units include a channel card and an analog modulation and demodulation unit, and said channel card includes a plurality of channel elements and a channel card processor for controlling the channel elements, and said channel elements modulate pilot channel, a synchronous channel and a call channel of a forward link, demodulate access channel of a backward link, modulate a communication channel of the forward link and demodulate a communication channel of a backward link channel, and said analog modulation and demodulation unit includes a Digital to Analog (D/A) converter for receiving a digital signal from the channel card and converting the received digital signal into an analog signal, a Quadrature Phase Shift Keying (QPSK) modulation unit for receiving the analog signal from the D/A converter and QPSK-modulating the received analog signal, a QPSK demodulation unit for receiving a Radio Frequency (RF) signal and QPSK-modulating the received RF signal, and an Analog to Digital (A/D) converter for receiving a QPSK demodulation signal from the QPSK demodulation unit and converting the received QPSK demodulation signal into a digital signal.

17. The base station of claim 13, further comprising a Radio Frequency (RF) signal processing means connected between the first and second signal processing units and a relay unit and having a RF transmission unit for receiving a forward link channel from the first and second signal processing units and modulating to a high frequency, and a RF receiving unit for receiving a backward channel signal from the relay unit for modulating to a low frequency.

18. A base station operation method for compensating a fixed route delay factor between a base station and a mobile station of a Code Division Multiple Access (CDMA) mobile communication system, comprising the steps of:

a first step in which a clock signal generation unit receives a 10 MHz, Time Of Day (TOD) and 1 Pulse Per Second (PPS) signal from a Global Positioning System (GPS) receiving unit and generates a 1st even second clock signal in synchronization with the 1 PPS;

a second step in which said first and second signal processing units receive a 1 st even second clock signal and modulate a pilot channel, a synchronous channel and a call channel by expediting by the maximum bidirectional propagation delay time between a base station to a relay unit;

a third step in which when an access channel is transmitted from the mobile station, the first signal processing unit detects and demodulates an access channel from the mobile station in synchronization with the 1st even second clock signal;

a fourth step in which the second signal processing unit modulates a communication channel of a forward link from the base station to the mobile station by expediting by the maximum bidirectional propagation delay time between the base station and the relay unit; and a fifth step in which when a communication channel is transmitted from the mobile station, the second signal processing unit detects and demodulates the communication channel from the mobile station in synchronization with the 1st even second clock signal.

19. In a base station of a Code Division Multiple Access (CDMA) mobile communication system capable of compensating a route delay factor on a communication route between a base station and a mobile station such as on a relay unit, a base station for compensating a route delay factor fixed between a base station and a mobile station of a CDMA mobile communication, comprising:

a clock signal generation unit for receiving a 10 MHz, Time Of Day (TOD) and 1 Pulse Per Second (PPS) signal from a Global Positioning System (GPS) receiving unit and generating a 1st even second clock signal in synchronization with the 1 PPS and a 3rd even second clock signal which is obtained by delaying the 1st even second clock signal by a maximum bidirectional propagation delay time between a base station and a relay unit;

a signal processing unit for receiving a 3rd even second clock signal from the clock signal generation unit and for modulating and transmitting a forward link channel from the base station to a mobile station in synchronization with the 3rd even second clock signal; and a signal processing unit for receiving the 1st even second clock signal from the clock signal generation unit and for detecting and demodulating a backward link channel from the mobile station to the base station in synchronization with the 1st even second clock signal.

20. In a base station of a Code Division Multiple Access (CDMA) mobile communication system capable of compensating a route delay factor on a communication route between a base station and a mobile station such as on a relay unit, a base station for compensating a route delay factor fixed between a base station and a mobile station of a CDMA mobile communication system, comprising:

a clock signal generation unit for receiving a 10 MHz, Time Of Day (TOD) and 1 Pulse Per Second (PPS) signal from a Global Positioning System (GPS) receiving unit and generating a 1st even second clock signal in synchronization with the 1 PPS and a 3rd even second clock signal which is obtained by delaying the 1st even second clock signal by a maximum bidirectional propagation delay time between a base station and a relay unit;

a signal processing unit for receiving the 3rd even second clock signal from the clock signal generation unit and modulating a pilot channel, a synchronous channel and a call channel of a forward link from a base station to a mobile station in synchronization with the $3^{rd}$ even second clock signal; and a signal processing unit for receiving the 1st even second clock signal from the clock signal generation unit, demodulating a backward link channel from the mobile station to the base station in synchronization with the 1st even second clock signal and modulating a communication channel of a forward link from the base station to the mobile station by expediting by the maximum bidirectional propagation delay time between the base station to the relay unit.

* * * * *